United States Patent
Brockmann et al.

(10) Patent No.: US 6,654,849 B1
(45) Date of Patent: Nov. 25, 2003

(54) METHOD AND APPARATUS TO MINIMIZE ADDITIONAL ADDRESS BITS AND LOADING WHEN ADDING A SMALL PATCH RAM TO A MICROCODE ROM

(75) Inventors: Russell C Brockmann, Ft Collins, CO (US); Kevin Liao, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,035

(22) Filed: Feb. 18, 2000

(51) Int. Cl.$^7$ ............................................. G06F 12/12
(52) U.S. Cl. ........................ 711/104; 365/104; 365/200; 714/710
(58) Field of Search .......................... 365/51–52, 63, 365/230.03, 200, 104, 189.01–189.02; 711/5, 102, 104, 170, 202; 714/7, 8, 710; 712/20, 23–24, 41, 43

(56) References Cited

U.S. PATENT DOCUMENTS

| | | | |
|---|---|---|---|
| 5,757,690 A | * | 5/1998 | McMahon .................. 365/104 |
| 5,796,974 A | * | 8/1998 | Goddard et al. ............. 712/211 |
| 5,859,999 A | | 1/1999 | Morris et al. ............... 712/224 |
| 5,860,017 A | | 1/1999 | Sharangpani et al. ......... 712/23 |
| 5,860,021 A | * | 1/1999 | Klingman .................... 712/32 |
| 6,073,252 A | * | 6/2000 | Moyer et al. ................... 714/7 |

OTHER PUBLICATIONS

Wolfe, A., "Patents shed light on Merced's Innards", Electronic Engineering Times, Feb. 15, 1999, pp. 43–44.

* cited by examiner

*Primary Examiner*—Matthew Kim
*Assistant Examiner*—Denise Tran

(57) ABSTRACT

An address space of a random access memory ("RAM") is overlaid over an address space of a read-only memory ("ROM") minimizing traditional address bits and loading of an address decoder. Word lines in the ROM in the overlap region are constructed without programming FETs. When the overlap region is addressed, the ROM is unable to change a pre-charged level of the ROM because of the lack of programming FETs. The RAM, however, is free to either leave the pre-charged level unchanged or to drive a node, as required. Thus, conflicts between the ROM and the RAM in the overlap region are eliminated and additional address bit are saved, and loading of address decoders is minimized.

11 Claims, 3 Drawing Sheets

METHOD AND APPARATUS TO MINIMIZE ADDITIONAL ADDRESS BITS AND LOADING WHEN ADDING A SMALL PATCH RAM TO A MICROCODE ROM

TECHNICAL FIELD

The technical field is computer architectures using microcode instructions.

BACKGROUND

Current computer systems may support multiple instruction sets. For example, some computer systems may implement a reduced instruction set computing ("RISC") architecture, but may also implement a complex instruction set computing ("CISC") instruction set architecture ("ISA") by emulating the CISC instructions with instructions from the RISC instruction set. The CISC instructions are referred to as macroinstructions and the RISC instructions are referred to as microinstructions.

Converting from a macroinstruction to microinstructions is often accomplished using one or more large, read-only memory ("ROM") structures. The ROM structures contain the microinstructions needed to emulate the original macroinstruction. The read-only nature of the memory structure allows for dense packing of the data.

A mechanism may be added to the computer system that allows the ROM to be corrected, or patched, by software without having to change hardware features. The method or apparatus for doing this patch may involve providing an array of random access memory ("RAM") that is written to by software. The RAM is significantly more costly in terms of area to implement, so that the size of the RAM is typically many times smaller than the size of the ROM.

A common method for addressing the RAM is to append the RAM address to the end of the address space to which the ROM corresponds. In many cases, this requires extra addressing bits. Moreover, because the RAM is small, the actual address space that could be included with these extra addressing bits is often only partially populated. In an example, a 4K entry ROM and a 32-entry RAM requires 12 address lines for the ROM and another address line for the 32-entry RAM.

SUMMARY

To overcome problems inherent in adding an additional address line for a patch RAM, the RAM and ROM are overlaid so that no additional address lines are needed.

The ROM structure may be a precharge-pull down or precharge-pull up structure. Other memory structures may also use the overlaid RAM/ROM configuration. Overlaying the RAM and the ROM may require that a subset of the ROM addresses be decoded and the ROM inhibited from responding. However, this can add extra timing and load to address decoders, especially when the overlapping section of RAM and ROM fall into several different ROM blocks. Accordingly, the normal ROM access is allowed to occur but the ROM is configured to be empty in all of the overlapping locations. The ROM is configured to be empty by not providing any programming field effect transistors ("FETs") in the overlap region of the ROM. Without the programming FETs, bit lines in the overlapped region of a ROM cannot change value from the pre-charged level. In the overlap region the RAM is free to either leave the pre-charged level unchanged (usually a logical zero) or to drive the node (usually a logical one). The ROM, not having any programming FETs in the overlap region, cannot conflict with the RAM and change the desired value. Overlapping the ROM and RAM in this fashion saves an address bit without incurring increased decode burden on the ROM address bits.

In an alternative configuration, an existing ROM block may be replaced with a RAM block. This configuration also minimizes additional loading.

DESCRIPTION OF THE DRAWINGS

The detailed description will refer to the following drawings in which like numerals refer to like elements, and in which.

DETAILED DESCRIPTION

A computer system is designed to support multiple instruction set architectures ("ISA"). For example, the computer system may support complex instruction set computing ("CISC") instructions and reduced instruction set computing ("RISC") instructions. The CISC instructions are implemented by emulating the CISC instructions with instructions native to the RISC instruction set. The CISC instructions are often referred to as macroinstructions and the RISC instruction as microinstructions. Each of the macroinstructions may be emulated by one or more microinstructions. To determine the correct sequence of microinstructions to emulate a macroinstruction, a microinstruction sequencer and a microcode read-only memory ("ROM") are provided. The ROM may be a large structure. For example, the ROM may contain 4K lines. The computer system may also include a mechanism that allows the ROM to be corrected or patched by software without having to change the structure of the ROM. A small array of random access memory ("RAM") is provided to perform this patching function. The patch RAM is much smaller in size than the ROM, on the order of 32 entries, for example.

Figure 1:
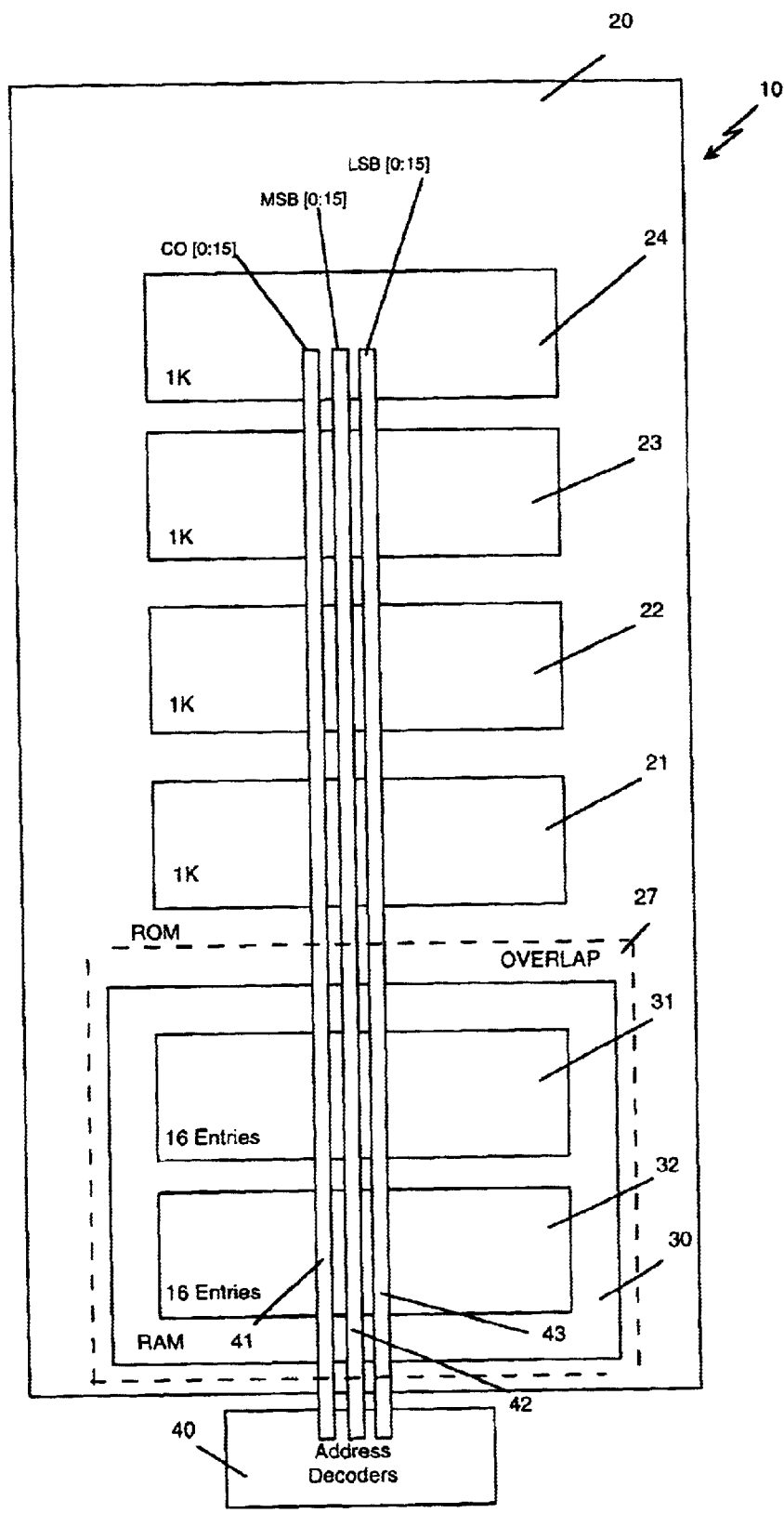
FIG. 1 illustrates an overlaid ROM and RAM.

FIG. 1 shows an arrangement of a memory structure 10 that may be used in a multiple architecture computer system. The memory structure 10 includes a microcode ROM 20 and a patch RAM 30. The ROM 20 may be a pre-charged-pull down or a pre-charged-pull up structure. Other memory structures are also possible with the ROM 20. The ROM 20 includes four memory blocks 21–24. Thus, the ROM 20 is a 4K-entry ROM and requires 12 address lines.

The patch RAM 30 is a 32-entry RAM containing two 16-entry blocks 31 and 32. Alternatively, the RAM 30 could include more or less entries and could be configured as two 32-entry blocks, for example. Further, one memory block or more than two memory blocks may be included in the RAM 30. As will be described later, the RAM 30 overlays the ROM 20 in overlap region 27 such that no additional address lines are needed to access the RAM 30.

Address decoders 40 are used to access entries in the ROM 20 and the RAM 30. The address decoders 40 access the entries using column 41, most significant bit line ("MSB") 42 and least significant bit line ("LSB") 43. The address decoders 40 use the 12 bits of address, which are broken into 3×4-bit address groups. Each 4 bit address group is decoded into a 16 bit address bus. One bit from each of the address buses are ANDed together to produce a word line.

The RAM 30 and the ROM 20 may overlap in any region or in any of the memory blocks 21–24. For example, the RAM 30 may overlap the ROM 20 in the memory block 21. In this example, memory block 21 may be addressed by an upper end of the address space.

The overlap region between the ROM 20 and the RAM 30 is constructed so that the ROM 20 is empty in the overlap region. To ensure that the ROM 20 is empty in the overlap region, the ROM 20 may be constructed with no programming field effect transistors ("FETs") in the overlap region of the ROM 20. Without the programming FETs, the ROM 20 cannot change a value from its pre-charged level. In the overlap region then, the RAM 30 is able to leave the charge unchanged (for example, a logical zero) or to drive a node (for example, a logical one). The ROM 20, not having any programming FETs in the overlap region, cannot conflict with the RAM 30 to attempt to change the desired value at the node.

Figure 2:
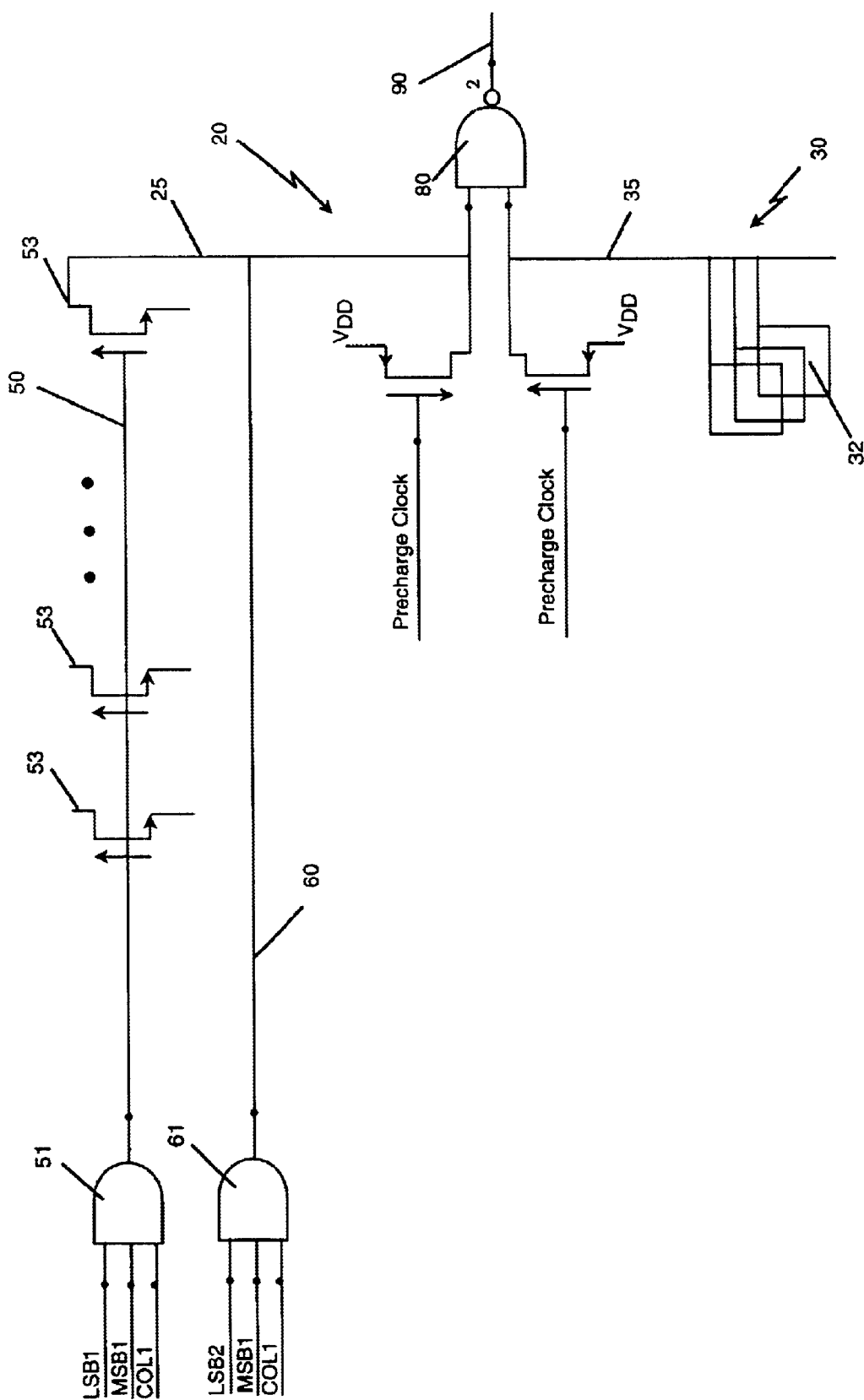
FIG. 2 is a more detailed drawing of the circuit elements of the memory structure shown in FIG. 1.

FIG. 2 is a more detailed diagram of the memory structure 10 showing how the overlap of the ROM 20 and the RAM 30 is accomplished. In FIG. 2, the ROM 20 is shown with a bit line 25 coupled to word lines 50 and 60. The word line 50 includes a dynamic AND comparator 51 that receives information from LSB 1, MSB 1 and column 1 address lines. The word line 50 is configured with one or more programming FETs 53 that are used to change the pre-charged value of the ROM 20. As shown in FIG. 2, the word line 50 would exist in a non-overlap area of the ROM 20. Word line 60 is an example of a word line that resides in the overlap region of the ROM 20. The word line 60 receives information from LSB 2, MSB 1 and column 1 address lines through a dynamic AND circuit 61. However, there are no programming FETs on the word line 60. Accordingly, if an address is sent to the overlap region of the ROM 20 corresponding to the word line 60, the ROM 20 does not change its pre-charged level at bit line 25. In FIG. 2, the decoded address lines LSB 1, 2, MSB 1 and column 1 are examples only, and other decoded address lines could be used in the memory structure 10.

The RAM 30 includes two or more 16-entry cells 32 coupled to bit line 35. The output of the bit line 25 and the bit line 35 are NANDed in NAND circuit 80 and applied to node 90. Thus, in operation, when a section of the memory structure 10 is addressed and the address is in the overlap region, because there are no programming FETs on the word lines in the overlap region, the ROM 20 cannot change its pre-charge level to effect the output at the node 90. However, the RAM 30 is free to either leave the pre-charge level unchanged or to drive the node 90 as required.

Figure 3:
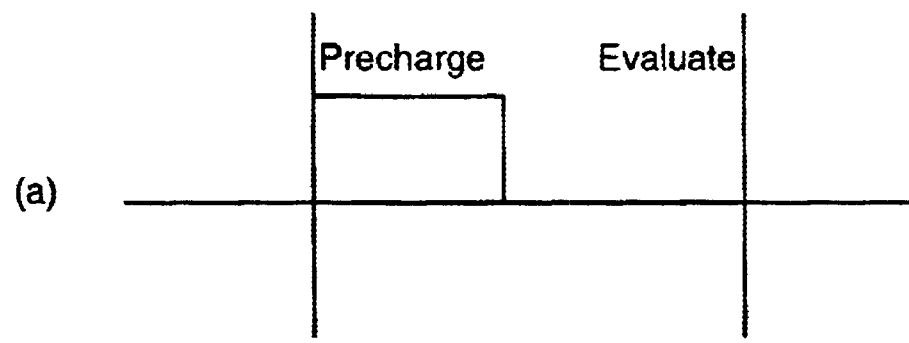
FIG. 3 is a timing chart that shows charge and discharge of the overlapped RAM and ROM.
Figure 3:
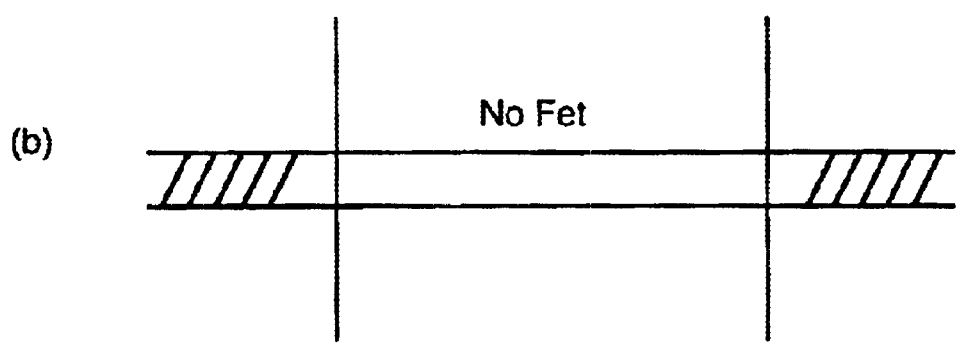
Figure 3:
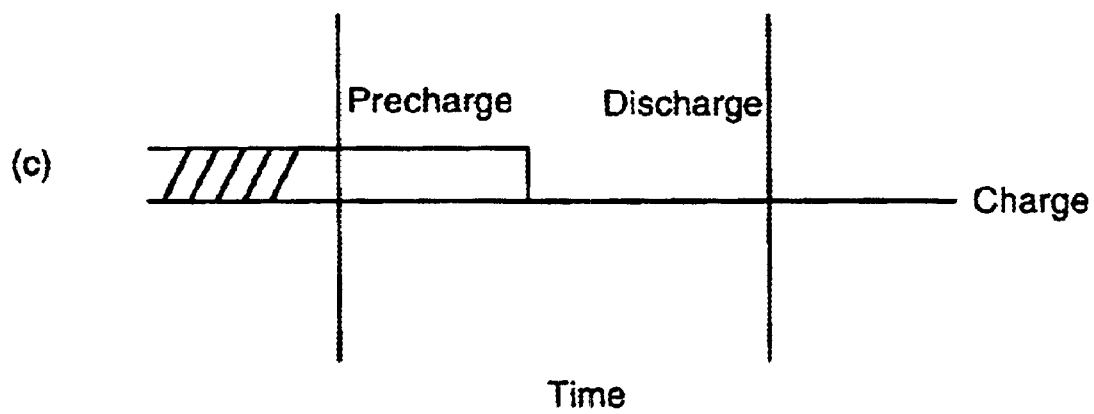

FIG. 3 illustrates operation of the ROM 20 in both the overlap and non-overlap regions. In FIG. 3, the trace (a) illustrates a clock period including a pre-charge portion of the clock cycle and an evaluate portion of the cycle. The trace (b) illustrates the output of a word line in the ROM 20 that exists in the overlap region. This word line, such as the word line 60 shown in FIG. 2, includes no programming FETs. Accordingly, during the evaluate cycle the output level of the ROM 20 is unchanged. The trace (c) illustrates the output of a word line in the ROM 20 having programming FETs.

The terms and descriptions used herein are set forth by way of illustration only and are not meant as limitations. Those skilled in the art will recognize that many variations are possible within the spirit and scope of the following claims, and their equivalents, in which are terms are to be understood in their broadest possible sense unless otherwise indicated.

What is claimed is:

1. An apparatus for minimizing address bits and loading, comprising:

a read-only memory ("ROM") having a plurality of word lines and a first address space;

a random access memory ("RAM") having a second address space that overlaps a portion of the first address space, the overlap creating an overlap region, wherein one or more word lines of the plurality of word lines in the overlap region are constructed with no field effect transistors.

2. The apparatus of claim 1, wherein the ROM (20) includes four memory blocks (21–24), each memory block comprising 1 K entries.

3. The apparatus of claim 1, wherein the RAM (30) comprises two memory blocks (31, 32), each of the memory blocks comprising 32 entries.

4. The apparatus of claim 1, wherein the overlap region is addressed by upper bits of an address space.

5. A method for reducing address bits and loading in a multi0architecture computer system, comprising:

providing a microcode ROM;

overlaying a RAM in a memory region of the ROM, thereby creating an overlap region;

constructing ROM word lines in the overlap region with no programming FETs.

6. The method of claim 5, further comprising segmenting the ROM into a plurality of memory blocks (21–24), each of the plurality of memory blocks comprising 1 K entries.

7. The method of claim 5, further comprising segmenting the RAM (30) into a plurality of memory blocks.

8. The method of claim 7, wherein each of the plurality of memory blocks comprises 32 entries.

9. An overlapping memory structure, comprising:

a first memory type having a first address space; and a second memory type having a second address space that overlaps a portion of the first address space, the overlap creating an overlap region, wherein the first memory type comprises a plurality of word lines, and wherein one or more word lines of the plurality of word lines in the overlap region are constructed with no field effect transistors.

10. The memory structure of claim 9, wherein the first memory type is a ROM and wherein the second memory type is a RAM, wherein the first memory type (20) comprises a plurality of word lines, and wherein one or more word lines (60) of the plurality of word lines in the overlap region are constructed without field effect transistors.

11. An apparatus for patching a computer system memory, comprising:

a read-only memory (ROM), comprising:
        word lines, and
        a first address space, wherein one or more of the word lines comprises no field effect transistors;

a patch random access memory (RAM) comprising a second address space, wherein the second address space and an overlap portion of the first address space comprise identical addresses, wherein addressing the overlap portion of the first address space addresses the patch RAM.

* * * * *